(12) United States Patent
Fox et al.

(10) Patent No.: US 11,979,795 B2
(45) Date of Patent: *May 7, 2024

(54) TRACKING VELOCITY INFORMATION

(71) Applicant: MASTERCARD TECHNOLOGIES CANADA ULC, Vancouver (CA)

(72) Inventors: Justine Celeste Fox, Pitt Meadows (CA); Marc Grimson, Ithaca, NY (US)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,231

(22) Filed: Dec. 8, 2022

(65) Prior Publication Data

US 2023/0106661 A1 Apr. 6, 2023

Related U.S. Application Data

(63) Continuation of application No. 16/918,288, filed on Jul. 1, 2020, now Pat. No. 11,553,306.

(51) Int. Cl.
*H04W 4/029* (2018.01)
*G06N 20/00* (2019.01)
*H04L 12/66* (2006.01)
*H04W 64/00* (2009.01)

(52) U.S. Cl.
CPC ............ *H04W 4/029* (2018.02); *G06N 20/00* (2019.01); *H04L 12/66* (2013.01); *H04W 64/006* (2013.01)

(58) Field of Classification Search
None
See application file for complete search history.

(56) References Cited

U.S. PATENT DOCUMENTS

2008/0168070 A1* 7/2008 Naphade .................. G06F 16/48
2014/0372346 A1* 12/2014 Phillipps ................ G06N 20/00
706/12

FOREIGN PATENT DOCUMENTS

EP 3588419 A1 1/2020

OTHER PUBLICATIONS

International Search Report and Written Opinion for Application No. PCT/CA2021/050862 dated Oct. 19, 2020 (8 pages).

* cited by examiner

*Primary Examiner* — Atta Khan
(74) *Attorney, Agent, or Firm* — Michael Best & Friedrich LLP

(57) ABSTRACT

Systems and methods for tracking velocity information. One system includes an application execution server providing an application layer. The application execution server is configured to receive a request including metadata. The application execution server is also configured to generate and transmit a response to the request. The application execution server is also configured to enrich the metadata by structuring the metadata for further processing by a data processing layer, where the further processing includes determining velocity information associated with the metadata, and by supplementing the metadata with available historical velocity information. The application execution server is also configured to transmit the enriched metadata for further processing by the data processing layer.

20 Claims, 4 Drawing Sheets

TRACKING VELOCITY INFORMATION

RELATED APPLICATIONS

This application is a continuation application of U.S. patent application Ser. No. 16/918,288, entitled "Tracking Velocity Information" filed on Jul. 1, 2020, the entire contents of which are hereby incorporated by reference herein.

FIELD

Embodiments described herein relate to tracking velocity information, and more particularly, to tracking velocity information related to request metadata.

BACKGROUND

Information about the frequency at which a particular data attribute has been observed (velocity information) may be used by machine learning models in a fraud prevention context. For example, velocity information may be used by machine learning models in order to determine whether a given request is fraudulent, such as an authentication or authorization request. However, for large scale applications receiving a high volume of requests, recording velocity information at scale and accurately is difficult and is often a source of increased operational overhead and strain on a system.

SUMMARY

Embodiments described herein provide methods and systems for tracking velocity information, for example, they are designed to be highly decoupled and provide support for large volumes of requests. Additionally, the embodiments described herein provide interfaces for real-time, near-time, and historical processing in both asynchronous and synchronous interfaces. Accordingly, embodiments described herein may reduce the operational overhead of tracking request metadata for machine learning while providing enhanced precision and functionality through a decoupled design that leverages a single source of truth (for example, a data warehouse). Latency for real-time or near-real-time applications may be improved through the use of database or event stream lookups. Additionally, embodiments described herein provide global scale machine learning solutions that leverage request metadata at high request volumes, such as at a rate of approximately 10,000,000 requests per second, as a result of the decoupled design described herein.

One embodiment provides a system for tracking velocity information. The system includes an application execution server providing an application layer. The application execution server is configured to receive a request including metadata. The application execution server is also configured to generate and transmit a response to the request. The application execution server is also configured to enrich the metadata by structuring the metadata for further processing by a data processing layer, where the further processing includes determining velocity information associated with the metadata, and by supplementing the metadata with available historical velocity information. The application execution server is also configured to transmit the enriched metadata for further processing by the data processing layer.

Another embodiments provides a method for tracking velocity information. The method includes accessing, with a data processing server, an enriched request event associated with enriched request metadata, where the enriched request metadata is structured in a key/value structure. The method also includes determining, with the data processing server, velocity information for the enriched metadata associated with the enriched request event, where the velocity information represents a frequency of at least one data attribute of the enriched metadata. The method also includes transmitting, with the data processing server, the velocity information for storage.

Yet another embodiment provides a non-transitory, computer-readable medium storing instructions that, when executed by an electronic processor, perform a set of functions. The set of functions includes receiving a request including metadata. The set of functions also includes generating and transmitting a response to the request. The set of functions also includes enriching, with the application layer, the metadata by restructuring the metadata. The set of functions also includes writing an enriched request event to an event stream layer, the enriched request event including the enriched metadata. The set of functions also includes accessing, with a data processing layer, the enriched request event. The set of functions also includes determining, with the data processing layer, velocity information for the enriched metadata associated with the enriched request event, the velocity information representing a frequency of a data attribute of the enriched metadata. The set of functions also includes transmitting, with the data processing layer, the velocity information for storage.

Other aspects of the embodiments described herein will become apparent by consideration of the detailed description and accompanying drawings.

Figure 1:
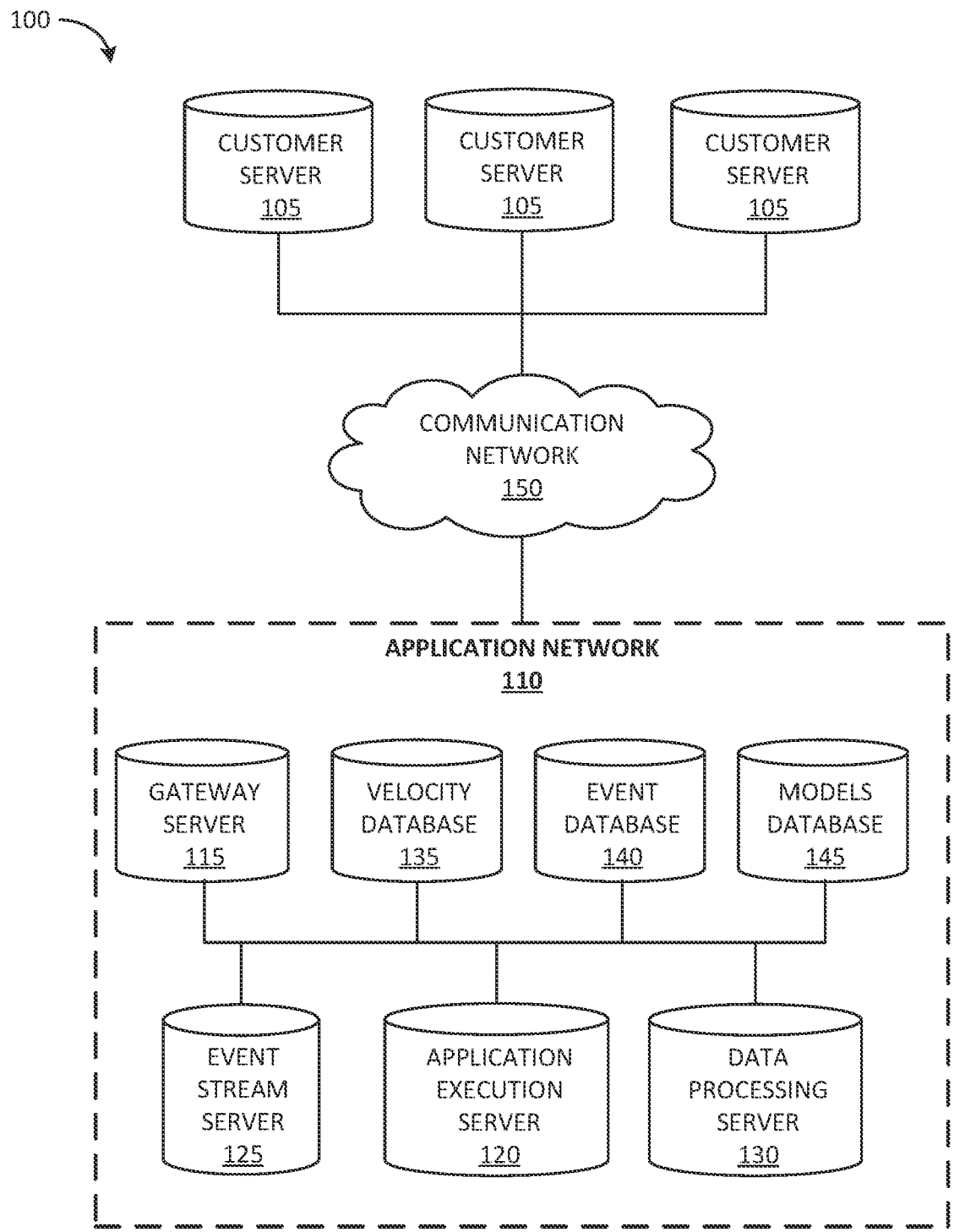
FIG. 1 is a block diagram of a system for tracking velocity information according to some embodiments.

Other aspects of the embodiments described herein will become apparent by consideration of the detailed description.

DETAILED DESCRIPTION OF THE EMBODIMENTS

Before embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 is a block diagram of a system 100 for tracking velocity information according to some embodiments. In the example shown, the system 100 includes a plurality of customer servers 105 (referred to herein collectively as "the customer servers 105" and individually as "the customer server 105") and an application network 110. In the illustrated example, the application network 110 includes a gateway server 115, an application execution server 120, an event stream server 125, a data processing server 130, a velocity database 135, an event database 140, and a models database 145 (referred to herein collectively as "the one or more components of the application network 110"). In some embodiments, the system 100 includes fewer, additional, or different components than illustrated in FIG. 1. For example, the system 100 may include a different number of customer servers and the three customer servers 105 included in FIG. 1 are purely for illustrative purposes.

The customer servers 105 and the application network 110 (including the one or more components of the application network 110) are communicatively coupled via a communication network 150. The communication network 150 is an electronic communications network including wireless and wired connections. Portions of the communication network 150 may be implemented using a wide area network, such as the Internet, a local area network, such as a Bluetooth™ network or Wi-Fi, and combinations or derivatives thereof. Alternatively or in addition, in some embodiments, components of the system 100 communicate directly with each other as compared to communicating through the communication network 150. For example, in some embodiments, the gateway server 115, the application execution server 120, the event stream server 125, the data processing server 130, the velocity database 135, the event database 140, and the models database 145 communicate directly with each other over one or more wired communication lines or buses, as illustrated in FIG. 1. Also, in some embodiments, the components of the system 100 communicate through one or more intermediary devices not illustrated in FIG. 1.

Figure 2:
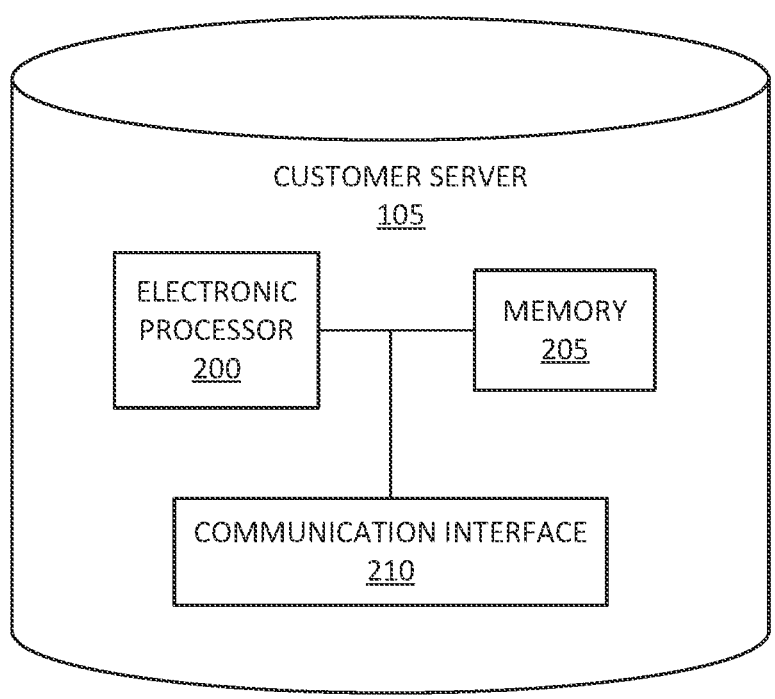
FIG. 2 is a block diagram of a server of the system of FIG. 1 according to some embodiments.

The customer server 105 may be a computing device and may include a desktop computer, a terminal, a workstation, a laptop computer, a tablet computer, a mobile device, or the like. As illustrated in FIG. 2, the customer server 105 includes an electronic processor 200 (for example, a microprocessor, an application-specific integrated circuit, or another suitable electronic device for processing data), a memory 205 (for example, a non-transitory computer-readable medium or another suitable memory device), and a communication interface 210. The electronic processor 200, the memory 205, and the communication interface 210 communicate wirelessly, over one or more communication lines or buses, or a combination thereof. The customer server 105 may include additional, fewer, or different components than those illustrated in FIG. 2 in various configurations. For example, although not illustrated, the customer server 105 may include a human-machine interface including one or more input devices, one or more output devices (for example, a display device), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

The communication interface 210 allows the customer server 105 to communicate with devices external to the customer server 105. For example, as illustrated in FIG. 1, the customer server 105 may communicate with the application network 110 through the communication interface 210. In particular, the communication interface 210 may include a port for receiving a wired connection to an external device (for example, a universal serial bus ("USB") cable and the like), a transceiver for establishing a wireless connection to an external device (for example, over one or more communication networks 150, such as the Internet, local area network ("LAN"), a wide area network ("WAN"), and the like), or a combination thereof.

The customer server 105 may provide an application (or service) to a user (for example, an end user, a group of users, an organization, another user entity, and the like). The user may interact with the customer server 105 either directly or indirectly via one or more intermediary devices (not shown). In some embodiments, the customer server 105 is part of a computing network, such as a distributed computing network, a cloud computing service, or the like. In such embodiments, the customer server 105 may communicate with the application network 110 as part of providing a cloud-based service to a user using a user device (not shown). Alternatively or in addition, the customer server 105 may be a user device used directly by a user to interact with the application network 110. In some embodiments, the customer server 105 interacts with the application network 110 (via, for example, the communication network 150) to leverage or access application functionality supported or provided by the application network 110. For example, in some embodiments, the application network 110 supports a web application, such as a financial services application, that provides financial services such that a user may access a corresponding user account to interact with and manage financial transactions, services, data, and the like. Alternatively or in addition, the application network 110 may support a web application providing supplemental functionality for a different application, such as supplemental security functions or mechanisms for a financial services application. A user (for example, an end user) may access the application supported by the application network 110 (through a browser application or a dedicated application stored on the customer server 105 that communicates with the application network 110) and interact with the application via a human-machine interface associated with the customer server 105.

As noted above and illustrated in FIG. 1, the application network 110 includes the gateway server 115, the application execution server 120, the event stream server 125, the data processing server 130, the velocity database 135, the event database 140, and the models database 145. However, in some embodiments, the application network 110 includes additional, fewer, or different components than illustrated in FIG. 1 in various configurations.

Alternatively or in addition, in some embodiments, the functionality (or a portion thereof) described as being provided by the application network 110, one or more components of the application network 110, or a combination thereof may be distributed among multiple networks, devices, servers, and the like. Alternatively or in addition, in some embodiments, the functionality (or a portion thereof) described as being provided by the application network 110, one or more components of the application network 110, or a combination thereof may be combined into a single device or server. For example, in some embodiments, the application network 110 may include a single device or server (for example, an application server) configured to provide the functionality described herein as being provided by the one or more components of the application network 110.

Although not illustrated, the gateway server 115, the application execution server 120, the event stream server 125, the data processing server 130, the velocity database 135, the event database 140, and the models database 145 may include similar components as the customer server 105 (an electronic processor, a memory, and a communication interface). However, in some embodiments, the gateway server 115, the application execution server 120, the event stream server 125, the data processing server 130, the velocity database 135, the event database 140, and the models database 145 includes additional, fewer, or different components.

Figure 3:
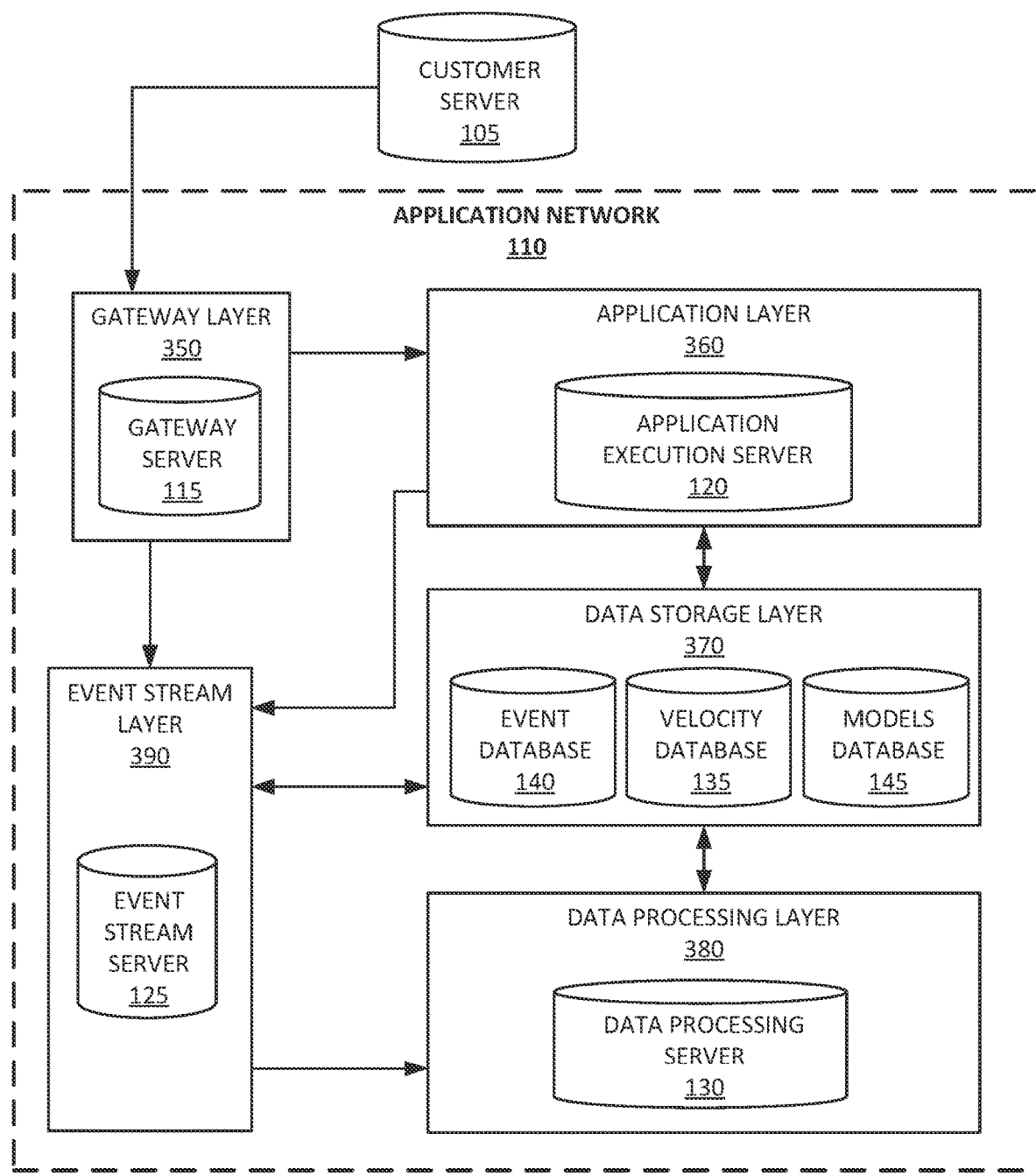
FIG. 3 is a block diagram illustrating a tiered application pattern provided by the system of FIG. 1 according to some embodiments.

In some embodiments, the application network 110 has a multitier application architecture (or a multilayer application pattern). For example, as illustrated in FIG. 3, the application network 110 may include a gateway layer 350, an application layer 360, a data storage layer 370, a data processing layer 380, and an event stream layer 390. In some embodiments, the application network 110 may include additional, different, or fewer layers than illustrated in FIG. 3 in various configurations. Additionally, each layer may include additional, different, or fewer components than illustrated in FIG. 3 in various configurations.

As seen in FIG. 3, the gateway layer 350 may include the gateway server 115. The functionality described herein as being performed by the gateway layer 350 may be performed by the gateway server 115 (via an electronic processor executing instructions). The gateway layer 350 functions as an entry point to the application network 110. In some embodiments, the gateway layer 350 serves as the only publically accessible entry point to the application network 110. As such, the gateway layer 350 is configured to receive one or more requests from the customer server 105 and process the received requests, and, ultimately, trigger application functionality (via the other layers of the tiered application pattern). Accordingly, in some embodiments, the gateway layer 350 contains or functions as an application programmable interface ("API") gateway. In some embodiments, the gateway layer 350 includes multiple technology components incorporated into a single layer that serves a functional purpose. For example, the gateway layer 350 may include technology components that implement edge security technology, enforce encryption protocols, and the like.

The application layer 360 may include the application execution server 120. The functionality described herein as being performed by the application layer 360 may be performed by the application execution server 120 (via an electronic processor executing instructions). The application execution server 120 executes (or performs) application or product functionality that supports an underlying application of the application network 110. The functionality may include, for example, the business logic for handling and responding to incoming requests from the gateway server 115. Alternatively or in addition, the functionality may include enriching metadata of a received request.

The event stream layer 390 may include the event stream server 125. The functionality described herein as being performed by the event stream layer 390 may be performed by the event stream server 125 (via an electronic processor executing instructions). The event stream server 125 provides event stream processing. Request events are streamed into the event stream layer 390 (for example, from the application execution server 120, the gateway server 115, or a combination thereof). A request event streamed into the event stream layer 390 may be stored in the event database 140 for further processing with the data processing layer 380 (via the data processing server 130). The event stream layer 390 (the event stream server 125 may include an event aggregation component (not shown) that aggregates events for bulk or batch processing by, for example, the data processing server 130.

The data processing layer 380 may include the data processing server 130. The functionality described herein as being performed by the data processing layer 380 may be performed by the data processing server 130 (via an electronic processor executing instructions). The data processing server 130 is configured to access and process one or more request events from the event database 140. In some embodiments, the data processing server 130 is configured to process a request event to determine velocity information for request metadata associated with the request event. Velocity information refers to count information about a frequency at which a particular data attribute has been observed. Such data attributes include an Internet Protocol (IP) address, a proxy IP address, a header, a query string, a post body, and the like. The data processing server 130 may transmit the velocity information to, for example, the velocity database 135 for storage. As noted above, in some embodiments, the data processing server 130 accesses multiple request events for bulk or batch processing. Accordingly, the data processing layer 380 may utilize the notion of notifications and queues to create fan out capabilities. Accordingly, the data processing layer 380 may include a notification component (not shown) and a queue component (not shown). For example, when request events are fanned out, the request events may be processed multiple times by different compute functions.

The data storage layer 370 may include the velocity database 135, the event database 140, and the models database 145. In some embodiments, the data storage layer 370 may include additional, fewer, or different components or databases than those illustrated in FIG. 3 in various configurations. For example, in some embodiments, the velocity database 135, the event database 140, the models database 145, or a combination thereof may be combined within a single database or distributed among multiple databases. As noted above, the event database 140 may store request events associated with the requests received at the gateway server 115 and the velocity database 135 stores velocity information. The models database 145 stores one or more machine learning models used for performing machine learning functions.

Figure 4:
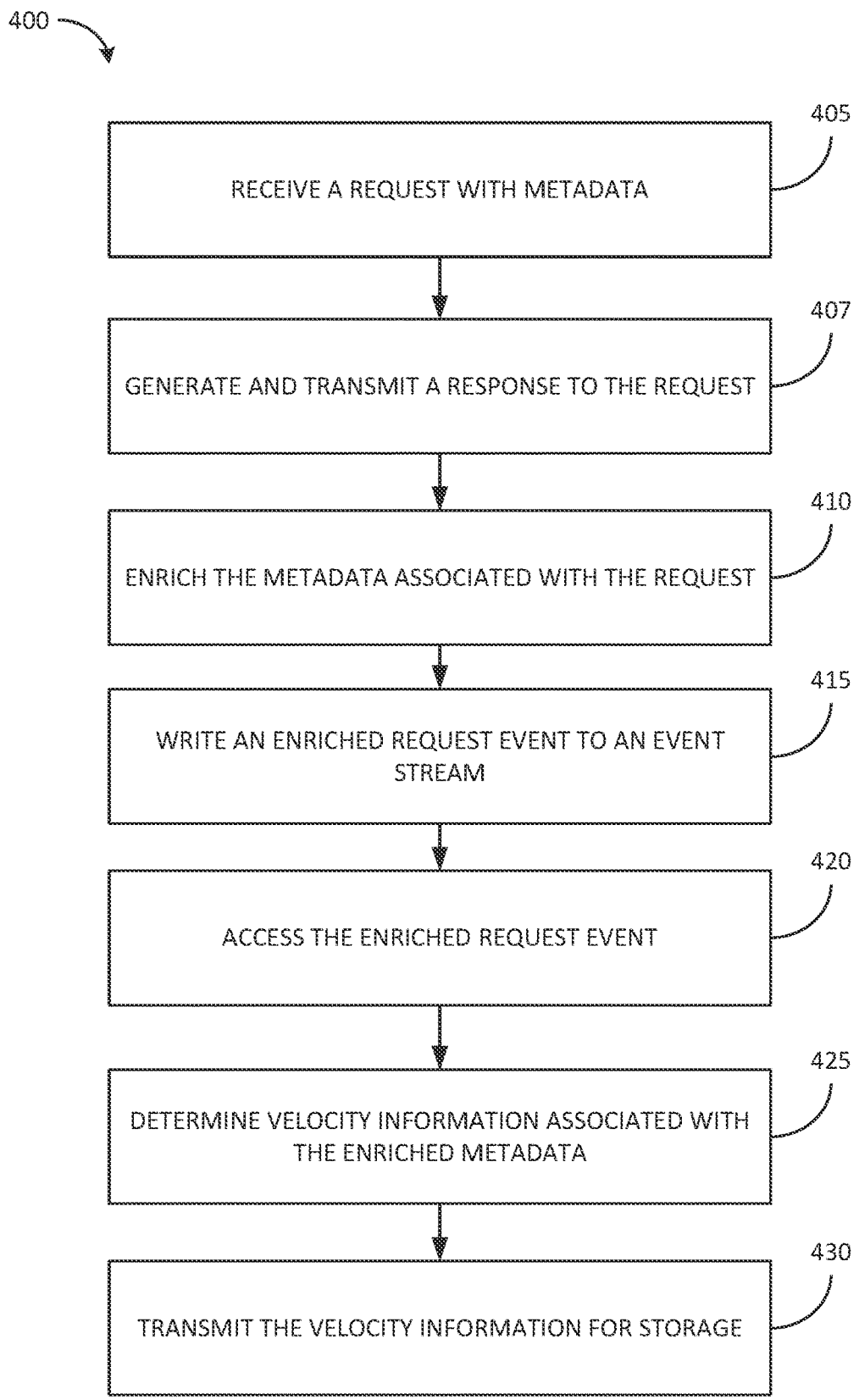
FIG. 4 is a flow chart of a method of tracking velocity information using the system of FIG. 1 according to some embodiments.

FIG. 4 is a flowchart illustrating a method 400 for tracking velocity information according to some embodiments. The method 400 will be described with reference to FIG. 3. As seen in FIG. 4, the method 400 includes receiving a request (at block 405). As noted above and illustrated in FIG. 3, the gateway server 115 may receive the request from a customer server 105. In some embodiments, the gateway server 115 receives the request from the customer server 105 through the communication network 150. For example, the gateway server 115 may receive the request from the customer server 105 through a virtual private network ("VPN"), a public connection (for example, public internet), and the like.

A request may include, for example, an authentication request, a retrieval request, an authorization request, a reporting request, a data processing request, and the like. The request received at the gateway server 115 may be a real-time request, a near-real time request, or a historical request. A real-time request may include a request that is blocking human interaction until a response is to the request is provided. An example of a real-time request may include a user attempting to purchase a product or service, where the transaction will not be completed until it is determined that the transaction is not fraud. Another example of a real-time request is a user attempting to log-in to their user account. A near-time request may be a request that is not necessarily blocking human interaction but is time sensitive. An example of a near-time request may include a user confirming a fraudulent transaction associated with an account, where the account will be disabled within a period of time (for example, within five minutes of the user confirming the fraudulent transaction). A historical request may include a request for reporting or batch analysis purposes on historical data. An example of a historical request may include a dashboard interface or display showing historical data. Another example of a historical request may include a merchant requesting a report of past fraudulent requests based on one or more criteria, such as location information or a specified time period or lookback period.

After receiving the request from the customer server 105, the gateway server 115 processes the request to determine routing for the request. For example, as seen in FIG. 3, the gateway server 115 may transmit the request to the event stream server 125, the application execution server 120, or a combination thereof. The gateway server 115 may determine routing for a request based on a characteristic of the request, such as a request type, request metadata, and the like.

In response to receiving the request from the gateway server 115, the application execution server 120 generates and transmits a response to the request (at block 407). In other words, in response to receiving the request from the gateway server 115, the application execution server 120 performs application functionality associated with the request (i.e., the underlying application supported by the application network 110) and generates and transmits the response based on the performance of the application functionality. In some embodiments, the application execution server 120 performs the application functionality using the metadata associated with the request. Alternatively or in addition, in some embodiments, the application execution server 120 accesses the data storage layer 370 as part of performing the application functionality. Accordingly, the application execution server 120 may access the velocity database 135, the models database 145, another component of the data storage layer 370, or a combination thereof in order to perform the application functionality. For example, the application execution server 120 may access a machine learning model from the models database 145 to perform a machine learning function as part of performing the application functionality. In some embodiments, the application execution server 120 applies the machine learning model to the velocity information stored in the velocity database 135, the metadata associated with the request, or a combination thereof in order to perform the application functionality associated with the request.

Alternatively or in addition, the application execution server 120 enriches metadata associated with the request (at block 410). The application execution server 120 may enrich request metadata by structuring the request metadata for further processing by the data processing server 130. In some embodiments, the application execution server 120 structures the metadata as a key/value structure with a key of "velocity" and a dictionary of associated metadata. A sample structure may include, for example: { . . . , "velocity": {"ipv4": "176.28.48.234", "geo": "lat19/long20", . . . }, . . . }. In this example, "velocity" is the key and the dictionary of associated metadata includes "ipv4": "176.28.48.234" and "geo": "lat19/long20". The key/value structure supports various queries of written events associated with the metadata, such as queries for the purpose of enriching machine learning models.

In some embodiments, the application execution server 120 may enrich request metadata by supplementing the request metadata with additional information, such as historical velocity information from the velocity database 135 when available (available historical velocity information). Historical velocity information may include, for example, velocity information associated with one or more previously enriched requests. Accordingly, in some embodiments, the application execution server 120 enriches request metadata by accessing available historical velocity information from the velocity database 135 and supplementing the request metadata with the available historical velocity information.

After enriching the request metadata (at block 410), the application execution server 120 writes an enriched request event to the event stream layer (i.e., the event stream server 125) (at block 415). In other words, the application execution server 120 generates an enriched request event and transmits the enriched request event to the event stream server 125. The enriched request event is associated with the enriched metadata (the enriched request). Accordingly, the enriched request event may include the enriched request metadata (for example, the original request metadata and the historical velocity information supplemented to the original request metadata).

In response to receiving the enriched request event, the event stream server 125 processes the enriched request event. In some embodiments, the event stream server 125 processes the enriched request event by performing event aggregation with one or more request events, as noted above. The event stream server 125 forwards the enriched request event to the event database 140 for storage. In some embodiments, the event stream server 125 also generates and transmits an event notification to the data processing server 130. In response to receiving the event notification, the data processing server 130 may be triggered to access the enriched request event (at block 420). In other words, the data processing server 130 may access the stored enriched request event from the event database 140. After accessing the enriched request event, the data processing server 130 determines velocity information for the enriched metadata associated with the enriched request event (at block 425). As noted above, velocity information refers to count information about a velocity or frequency that a particular data attribute has been observed, such as an Internet Protocol (IP) address, a proxy IP address, a header, a query string, a post body, and the like.

As noted above, in some embodiments, the data processing server 130 may perform bulk or batch processing. Accordingly, in such embodiments, the data processing server 130 may access more than one request (aggregated requests) from the event database 140 and determine velocity information for the metadata associated with the requests.

After determining the velocity information (at block 430), the data processing server 130 transmits the velocity information for storage (at block 435). As seen in FIG. 3, the data processing server 130 may transmit the velocity information to the velocity database 135 for storage. As noted above, in some embodiments, the application execution server 120 accesses the velocity database 135 to obtain available historical velocity information. Accordingly, in some embodiments, the velocity information transmitted by the data processing server 130 is stored in the velocity database 135 as historical velocity information for a subsequent or new request.

Thus, the embodiments described herein provide, among other things, methods and systems for tracking velocity information.

Various features and advantages of the invention are set forth in the following claims.

What is claimed is:

1. A system for tracking velocity information, the system comprising:
    an application execution server providing an application layer, the application execution server comprising a processor and memory, the application execution server configured to
        receive a request including metadata,
        generate and transmit a response to the request,
        enrich the metadata by
            structuring the metadata for further processing by a data processing layer, wherein the further processing includes determining velocity information associated with the metadata, and
            supplementing the metadata with available historical velocity information, and
        transmit the enriched metadata for further processing by the data processing layer; and
    an event stream server providing an event stream layer, the event stream server comprising a processor and memory, the event stream server configured to
        trigger, by transmitting an event notification, the data processing layer to access an enriched request event that includes the enriched metadata, the event notification associated with the enriched request event.

2. The system of claim 1, further comprising:
    the data processing server providing the data processing layer, the data processing server configured to
    access the enriched metadata from storage,
    determine the velocity information associated with the enriched metadata, the velocity information representing a frequency of a data attribute of the enriched metadata, and
    transmit the velocity information associated with the enriched metadata to a velocity database for storage.

3. The system of claim 2, wherein the data attribute includes at least one selected from a group consisting of an Internet Protocol (IP) address, a proxy IP address, a header, a query string, and a post body.

4. The system of claim 1, further comprising:
    the event stream server configured to
    receive the enriched request event associated with the enriched metadata from the application execution server, the enriched request event including the enriched metadata, and
    transmit the enriched request event to an event database for storage, the event database accessible by the data processing layer.

5. The system of claim 1, further comprising:
    a gateway server providing a gateway layer, the gateway server configured to
        receive the request from a customer server, and
        route the request to the application execution server.

6. The system of claim 1, wherein the application execution server is configured to access a machine learning model from a models database and generate the response to the request using the machine learning model.

7. The system of claim 6, wherein the application execution server is configured to generate the response to the request using the machine learning model and at least one selected from a group consisting of the velocity information associated with the request, the available historical velocity information associated with the request, and the metadata associated with the request.

8. The system of claim 1, wherein the application execution server is configured to structure the metadata in a key/value structure.

9. The system of claim 1, further comprising:
    a velocity database of a data storage layer, the velocity database configured to
        receive the velocity information from the data processing layer after the further processing of the enriched metadata and
        store the velocity information,
    wherein the velocity database is accessible by the application execution server.

10. The system of claim 1, wherein the available historical velocity information is associated with at least one preceding request received by the application execution server.

11. A method for tracking velocity information, the method comprising:
    transmitting, with an event stream server, an event notification to a data processing server, in response to receiving the event notification, accessing, with the data processing server, an enriched request event stored in an event data base, the enriched request event associated with an enriched request metadata, wherein the event notification triggers further processing of the enriched metadata associated with the enriched request event by the data processing server;

determining, with the data processing server, velocity information for the enriched metadata associated with the enriched request event; and transmitting, with the data processing server, the velocity information for storage.

12. The method of claim 11, wherein accessing the enriched request event associated with the enriched request metadata includes accessing an enriched request event associated with enriched request metadata that is supplemented with available historical velocity information.

13. The method of claim 11, wherein transmitting the velocity information for storage includes transmitting the velocity information to a velocity database of a data storage layer for storage.

14. The method of claim 11, wherein accessing the enriched request event includes accessing the enriched request event from an event database of a data storage layer.

15. The method of claim 11, wherein determining the velocity information includes determining a frequency of at least one selected from a group consisting of an Internet Protocol (IP) address, a proxy IP address, a header, a query string, and a post body.

16. A non-transitory, computer-readable medium storing instructions that, when executed by an electronic processor, perform a set of functions, the set of functions comprising:
receiving a request including metadata;
generating and transmitting a response to the request;
enriching, with an application layer, the metadata by restructuring the metadata;
writing, with the application layer, an enriched request event to an event stream layer, the enriched request event including the enriched metadata;

accessing, with a data processing layer, the enriched request event stored in an event database, wherein an event notification from the event stream layer triggers further processing of the enriched metadata associated with the enriched request event by a data processing layer;

determining, with the data processing layer, velocity information for the enriched metadata associated with the enriched request event; and transmitting, with the data processing layer, the velocity information for storage.

17. The non-transitory, computer-readable medium of claim 16, wherein the set of functions further comprises:
receiving a subsequent request including new metadata;
enriching the new metadata by
restructuring the new metadata, and
accessing the velocity information from storage and supplementing the new metadata with the velocity information, the velocity information representing a frequency of a data attribute of the enriched metadata.

18. The non-transitory, computer-readable medium of claim 16, wherein accessing the enriched request event includes accessing the enriched request event from a data storage layer.

19. The non-transitory, computer-readable medium of claim 16, wherein the set of functions further comprises:
accessing, with the application layer, a machine learning model from a data storage layer, and
generating the response to the request using at least one selected from a group consisting of the machine learning model, the metadata associated with the request, and available historical velocity information.

20. The non-transitory, computer-readable medium of claim 16, wherein restructuring the metadata includes restructuring the metadata in a key/value structure.

* * * * *